No. 614,512. Patented Nov. 22, 1898.
G. K. SPITZENBERG.
APPARATUS FOR CULTIVATING THE SOIL.
(Application filed Apr. 25, 1896.)

(No Model.)

Witnesses
A. J. Haddan
D. Haslett

Inventor
G. K. Spitzenberg,
per R. Haddan
Attorney

UNITED STATES PATENT OFFICE.

GEORG KARL SPITZENBERG, OF EISENACH, GERMANY.

APPARATUS FOR CULTIVATING THE SOIL.

SPECIFICATION forming part of Letters Patent No. 614,512, dated November 22, 1898.

Application filed April 25, 1896. Serial No. 589,113. (No model.)

*To all whom it may concern:*

Be it known that I, GEORG KARL SPITZENBERG, a subject of the King of Prussia, German Emperor, and a resident of Eisenach, in the Grand Duchy of Saxe-Weimar-Eisenach, in the German Empire, have invented a certain new and useful Improved Apparatus for Cultivating Soil, (for which I have obtained Letters Patent in Germany, No. 82,114, dated January 21, 1893; in Luxemburg, No. 2,243, dated February 23, 1895; in France, No. 245,452, dated February 28, 1895; in Belgium, No. 114,334, dated February 28, 1895; in Spain, No. 17,074, dated February 28, 1895; in England, No. 4,609, dated March 4, 1895; in Denmark, No. 637, dated March 4, 1895; in Norway, No. 4,857, dated March 9, 1895; in Sweden, No. 7,411, dated March 12, 1895; in Italy, No. 38,456, dated March 26, 1895; in Hungary, No. 2,855, dated March 26, 1895, and in Russia March 1, 1895, accepted December 3, 1897,) of which the following is a specification.

This invention relates to an improved apparatus for cultivating soil which is principally intended for arboriculture, but can also be used with equal advantage for field and garden culture.

In soil preparation by means of the plow or spade the soil layers have been reversed and there is a well-defined limit between the dug and the undug soil. Both these circumstances have an extremely injurious effect on the natural development of the plants, and especially of young trees, as the reversing of the soil layers causes in tree-plants an abnormal formation of root system, while a well-defined digging limit not only hinders the normal growing of the roots from the dug soil into the undug soil, but also favors the drying up of the loosened soil. These inconveniences are avoided by the use of the present device, as the upper, usually vegetable, and nutritious layer is loosened with the under layer to the desired depth, while the layers remain, essentially, in their natural positions, and that no well-defined digging limit is formed.

Figure 1:
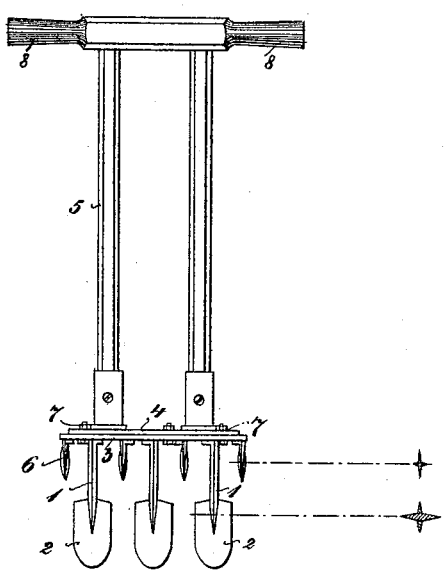
Figure 2:
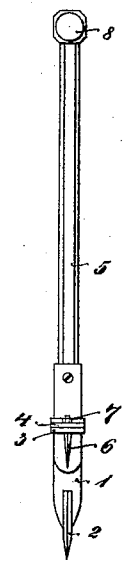
Figure 3:
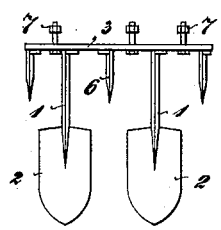
Figure 4:
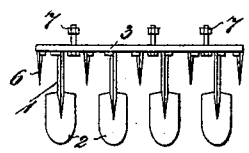

In the annexed drawings, Figure 1 is a front view of this device. Fig. 2 is a side view. Figs. 3 and 4 show details.

The digging parts of the present soil-cultivating device consist of longitudinal blades 1 and cross-blades 2, which may be caused to enter the soil from outside and move in the same in an oscillatory manner. These longitudinal and cross blades 1 and 2 are called "digging-spades" in the hand device shown in the annexed drawings and are connected with one another and arranged one above the other on a bar or plate 3. The latter can be connected in an interchangeable manner with the bar 4 of the handle-shank 5 by means of screws 7, so that the soil-loosening parts 1 and 2 of the device can be changed according to varying circumstances and replaced by others when necessary, Figs. 3 and 4. Between the longitudinal and cross blades 1 and 2, standing united over one another, there are arranged also intermediary blades 6 for the further disintegrating and mixing of the soil. The handle-shank 5 of the spade is provided at the upper part with two lateral handles 8.

The device is operated with both hands by putting the foot on the bar 4, causing the spade to enter into the soil by moving the handle-shank 5 to and fro.

I claim as my invention in devices for loosening the soil for wood, field, and garden culture—

1. The combination of a handle-shank 5, a bar at the under end of the same, and soil-loosening members below said bar consisting of longitudinal blades 1 and of cross-blades 2.

2. The combination of a handle-shank 5, a bar attached to the lower end thereof, a second bar detachably fastened below the aforesaid bar and longitudinal blades 1 and cross-blades 2, mounted on the second bar.

3. The combination with a handle-shank, of a base-plate at the lower end of said handle-shank, vertical blades projecting downward from said lower plate and other vertical blades in planes rectangular to the planes of the aforesaid vertical blades and attached to the latter in downward prolongation thereof.

4. The combination with a handle-shank, of a base-plate at the lower end of said handle-shank, vertical blades projecting downward from said lower plate, other vertical blades in planes rectangular to the planes of the aforesaid vertical blades and attached to the latter in downward prolongation thereof, and a third set of vertical blades projecting downward from the base-plate, between the first-mentioned blades.

In testimony whereof I have signed this specification in the presence of two subscribing witnesses.

GEORG KARL SPITZENBERG.

Witnesses:
FANNIE MOORE,
OTTO GEYER.